United States Patent [19]
Colvin, Sr.

[11] Patent Number: 6,041,123
[45] Date of Patent: Mar. 21, 2000

[54] CENTRALIZED SECURE COMMUNICATIONS SYSTEM

[75] Inventor: Bryan Colvin, Sr., San Jose, Calif.

[73] Assignee: Allsoft Distributing Incorporated, San Jose, Calif.

[21] Appl. No.: 08/673,122

[22] Filed: Jul. 1, 1996

[51] Int. Cl.[7] .................................................. H04L 9/00
[52] U.S. Cl. ........................................... 380/49; 380/25
[58] Field of Search .................................. 380/21, 25, 49

[56] References Cited

U.S. PATENT DOCUMENTS

| | | | |
|---|---|---|---|
| 4,203,166 | 5/1980 | Ehrsam et al. | 375/2 |
| 4,458,109 | 7/1984 | Mueller-Schloer | 380/25 |
| 4,484,025 | 11/1984 | Ostermann et al. | 380/49 |
| 4,578,530 | 3/1986 | Zeidler | 380/25 |
| 4,720,859 | 1/1988 | Aaro et al. . | |
| 4,776,011 | 10/1988 | Busby . | |
| 5,003,597 | 3/1991 | Merkle . | |
| 5,241,599 | 8/1993 | Bellovin et al. . | |
| 5,263,085 | 11/1993 | Shamir . | |
| 5,297,206 | 3/1994 | Orton . | |
| 5,301,235 | 4/1994 | Shimada . | |
| 5,444,780 | 8/1995 | Hartman, Jr. | 380/25 |
| 5,452,358 | 9/1995 | Normile et al. . | |
| 5,511,123 | 4/1996 | Adams . | |
| 5,519,736 | 5/1996 | Ishida . | |
| 5,533,127 | 7/1996 | Luther . | |
| 5,539,827 | 7/1996 | Liu . | |
| 5,570,307 | 10/1996 | Takahashi . | |
| 5,574,673 | 11/1996 | Lowy . | |
| 5,600,722 | 2/1997 | Yamaguchi et al. | 380/49 |
| 5,600,724 | 2/1997 | Masnikosa . | |
| 5,602,845 | 2/1997 | Wahl . | |
| 5,602,917 | 2/1997 | Mueller . | |
| 5,604,807 | 2/1997 | Yamaguchi et al. | 380/21 |
| 5,608,802 | 3/1997 | Alvarez . | |
| 5,613,005 | 3/1997 | Murakami et al. . | |
| 5,619,576 | 4/1997 | Shaw . | |
| 5,623,545 | 4/1997 | Childs et al. . | |
| 5,627,894 | 5/1997 | Albert et al. . | |
| 5,657,390 | 8/1997 | Elgamal et al. | 380/49 |
| 5,661,803 | 8/1997 | Cordery et al. | 380/49 |
| 5,825,881 | 10/1998 | Colvin, Sr. | 380/25 |

OTHER PUBLICATIONS

Marvin A. Sirbu, "Internet Billing Service Design and Prototype Implementation"; IMA Intellectual Property Project Proceedings, (vol. 1, issue 1, pp. 67–79; Jan. 1994).

Brian Santo, "Bill–paying Put On–line"; Electronic Engineering Times (n840, p. 82; Mar. 20, 1995).

"The NetBill Electronic Commerce Project"; Carnegie Mellon University; May 15, 1995.

Bruce Schneier, *Applied Cryptography*, 2nd Edition, 1996, p. 419.

*Primary Examiner*—Salvatore Cangialosi
*Attorney, Agent, or Firm*—McCutchen, Doyle, Brown & Enersen, LLP

[57] ABSTRACT

A system of secure communications between multiple parties. This system uses an index/secure key combination for each party. The index key never changes its value. A secured central router with access to a master database uses index keys to look up corresponding secure keys in the master database. The central router uses the secure keys to decrypt messages sent by parties and reencrypt the messages for the recipients and, thus, acts as a conduit for secure communications between parties.

14 Claims, 2 Drawing Sheets

CENTRALIZED SECURE COMMUNICATIONS SYSTEM

FIELD OF THE INVENTION

The present invention relates to communication over a public network and, more particularly, to secure transmission of information over a public network.

BACKGROUND OF THE INVENTION

Public computer networks, such as the Internet, are increasingly being used to conduct confidential communications. In order to keep such communications secure, one must prevent unauthorized access to confidential data, maintain the integrity of the communications and data, and authenticate the origin of data that has been received.

A variety of encryption systems have been developed to address these needs. Different encryption systems offer different degrees of security. In conventional encryption systems, the recipient of the message generally has some knowledge related to an original and secure key used to encrypt the message. This constitutes a major limitation on the degree of security current systems can provide.

For example, most conventional encryption systems, such as PGP (pretty good privacy), use a mathematical relationship that ties both private and public keys together, thereby creating a temporary "working key" that is identical on each end of the transmission. This mathematical relationship is based upon the product of two very large prime numbers of the form: $(2^n)-1$. Once this product is known, the secure key can then be determined and the entire system is jeopardized.

Another problem with conventional systems is the fact that the sender and recipient must typically exchange a "session key" before the sender may engage in secure communications with the recipient. For example, the sender may need first to give out its public key to the recipient and wait to receive a "session key" from the target recipient before the sender can finally send out its message. The "session key" returned to the sender may be a function of the sender's public key, intermixed with the recipient's private key. The substantial delay resulting from the need to create and communicate "session keys" between the sender and recipient before any communications can occur reduces the efficiency of the communications system.

Moreover, if the session key is a function of the sender's public key and the recipient's private key, those keys must remain static in order to continue using the prior-negotiated session keys. If either key is changed, the sender and recipient must renegotiate the exchange of session keys, thereby further reducing the efficiency of the system.

Finally, traditional encryption systems are inefficient in sending the same message to multiple parties. A single sender must encrypt the same message differently for each targeted recipient and transmit each encrypted message separately.

The need for increased security is becoming more acute as communications and data transmitted across unsecured media such as the Internet become more sensitive and valuable. Moreover, increasing volume and sophistication of transmissions has created a need for a more efficient encryption system.

Accordingly, there is a need for an encryption system which reduces disadvantages associated with conventional encryption systems.

SUMMARY OF THE INVENTION

Broadly stated, the present invention encompasses a communications system used by a plurality of clients. Each client has a secure key and an encryptor/decryptor for encrypting and decrypting messages using the secure key. In preferred embodiments of the present invention, communications between clients pass through a master key router. The master key router acts as a conduit for secured communications among clients by translating an encrypted message from a sending client to one or more recipient clients using their respective secure keys.

Preferred embodiments of the present invention further include a master key server having a database in which duplicates of clients' secure keys are stored. The master key server has the capability to look up a client's secure key by referring to an index key associated with the client.

An object of the present invention is, therefore, to provide an improved communications system.

Another object of the present invention is to simplify secured communications by removing the need to exchange session keys before the transmission of data.

Yet another object of the present invention is to provide a communications system which achieves increased security for information communicated over the system by ensuring there is no discoverable relationship between the key used by a recipient client to decrypt a message and the key used by the sending client to encrypt the message.

A further object of the present invention is to provide a communications system which achieves heightened security for information communicated over the system by allowing the secure key to be extremely large.

Still another object of the present invention is to provide a communications system with increased security for information communicated over the system by restricting access to the system to clients who engage in communications for a particular purpose. For example, the present invention can protect the integrity of commercial transactions conducted over the communications system by allowing only commerce to take place and forbidding transmission to non-commercial entities.

A further object of the present invention is to provide a communications system which does not require a "static" secure key. By changing the secure keys of sending clients after each transmission, the present invention makes future messages unrelated to prior messages, thereby making the secure key a "moving target" and therefore more difficult to decipher.

An additional object of the present invention is to provide a communications system which achieves heightened security for information communicated over the system by assigning each client an encryption algorithm that is, for all practical purposes, unique.

Yet another object of the present invention is to provide a communications system which allows a client to send a single message to multiple recipients while spending a minimal amount of time on the system.

These and other objects of the present invention will become apparent to those skilled in the art from the following detailed description of the invention and preferred embodiments, the accompanying drawings, and the appended claims.

DETAILED DESCRIPTION OF PREFERRED EMBODIMENT(S)

The present invention encompasses a wide variety of communications systems. Such systems preferably have a plurality of clients connected to a wide area network. Under such systems, a Master Key Router is also connected to the network. The Master Key Router receives encrypted communications from a sending client, decrypts the information, reencrypts the information in a specific manner such that a particular receiving client can decrypt it, and sends the reencrypted information to the receiving client. In preferred embodiments of the present invention, the Master Key Router is one or more computers acting as a router for client communications and a centralized means for encrypting and decrypting client communications.

Under some preferred embodiments, the Master Key Router obtains secure keys and information about the encryption/decryption methods of the sending and receiving clients necessary to perform its functions from a Master Key Server which contains a database with secure keys and encryption algorithm numbers for each client indexed by that client's public index key.

Figure 1:
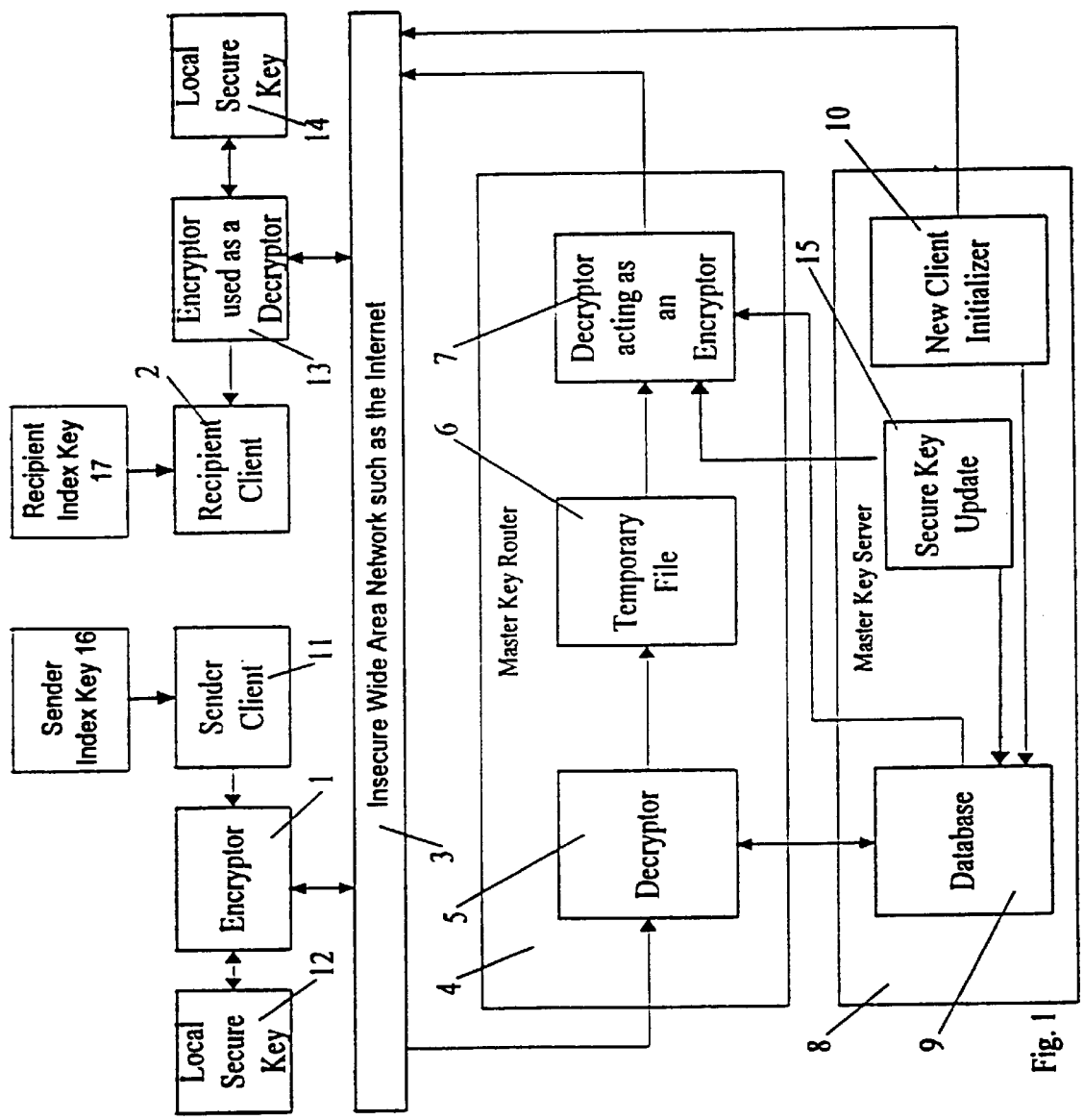
FIG. 1 is a block diagram of the logical structure of a communications system according to the present invention having a plurality of clients and incorporating a master key server and master key router as a conduit for decrypting and encrypting communications between clients connected to the system.

The logical structure of a preferred embodiment of a communications systems according to the present invention wherein a client may send a secure transmission to one or more other clients is shown in FIG. 1. The preferred system comprises at least one Sender Client 11 and at least one Recipient Client 2, a Wide Area Network 3, a Master Key Router 4, and a Master Key Server 8. The Sender Client 11 and Recipient Client 2 each have a Local Secure Key 12, 14 (respectively). The Sender Client 11 has a Sender Index Key 16 and the Recipient Client 2 has a Recipient Index Key 17. The Sender Client 11 has an encryption/decryption means, Encryptor 1 (hereinafter referred to as "Sender's Encryptor/Decryptor 1"), which the Sender Client 11 uses as an encryptor. The Recipient Client 2 also has an encryption/decryption means, Encryptor used as a Decryptor 13 (hereinafter referred to as "Recipient's Encryptor/Decryptor 13"), which the Recipient Client 2 uses as a decryptor.

The Master Key Server 8 includes a Database 9 which contains secure keys for all existing clients in the system indexed by each client's corresponding index key. The Master Key Router 4 includes a Decryptor 5 and a Decryptor Acting as an Encryptor ("DAE") 7. The DAE 7 is an inverted encryptor that uses a decryption algorithm for encryption purposes. While the preferred embodiments of the present invention contemplate that a large number of clients will be connected to the system and that each individual client could be a Sender Client 11 or Recipient Client 2 at any given time, for the sake of clarity, only one Sender Client 11 and one Recipient Client 2 are depicted in FIG. 1.

A Sender Client 11 provides information which is to be encrypted and ultimately communicated to a Recipient Client 2. After decrypting the message, the Recipient Client 2 should have access to a communication which is exactly the same as the original communication transmitted by the Sender Client 11.

In a preferred embodiment of the present invention, each client has an index key and a secure key. Once a client is assigned an index key, the key never changes. A client's secure key, however, changes after that client sends a transmission. Each client also has a client program which generally provides a user interface and communications protocols which allow the client to communicate on the Wide Area Network 3. It will be apparent to those skilled in the art based on the present disclosure that a wide variety of traditional methods may be used to create a client program with adequate user interfaces and communications protocols.

The client program further includes a client encryption algorithm, made up of an algorithm engine patched with the client's algorithm number, which can be used to encrypt messages being sent by the client (Sender's Encryptor/Decryptor 1) or decrypt messages received by the client (Recipient's Encryptor/Decryptor 13). The method for generating client algorithms is disclosed below. Based on the present disclosure, those skilled in the art will understand how to implement the disclosed method for generating client algorithms within the client program.

The secure communications process under the preferred embodiments of the present invention begins with the Sender Client 11 who provides information to be communicated to a Recipient Client 2. The Sender Client 11 also adds a small address header to the original message referencing the Recipient Index Key 17 which serves to instruct the Master Key Router 4 where ultimately to send the message. The Sender's Encryptor/Decryptor 1 (the sender client's encryption algorithm) located within the sender's client program takes the message information and address header from the Sender Client 11 and scrambles the data using the Local Secure Key 12. The message information and address header are encrypted serially and then transmitted through a Wide Area Network 3 along with the Sender Index Key 16 to the Master Key Router 4.

Encryption and decryption are fully reversible processes. Information that is encrypted using a particular algorithm can be decrypted using the inverse algorithm. Conversely, information that is encrypted using the inverse of a particular algorithm can be decrypted using the original algorithm. Preferably, each client is given only one encryption algorithm as a method of encoding data because the reverse process is difficult to derive. Under the preferred embodiment each client has only one algorithm (and not the inverse of that algorithm) within its client program to encrypt and decrypt its data messages. In FIG. 1, the sender client's algorithm is labeled the Sender's Encryptor/Decryptor 1 and the recipient client's algorithm is labeled the Recipient's Encryptor/Decryptor 13. Although different labels are used, for illustrative purposes, to identify the client algorithms in FIG. 1, it should be appreciated that all client algorithms are able to function as an encryptor or decryptor depending on whether the client is sending or receiving messages at any given time.

Under some preferred embodiments of the present invention, the Master Key Router 4 and Master Key Server 8 serve as a conduit for secure communications between the Sender Client 11 and the Recipient Client 2 by decrypting the message from the Sender Client 11 using the inverse algorithm of the Sender's Encryptor/Decryptor 1 and re-encrypting the message for transmission to the Recipient Client 2 using the inverse algorithm of the Recipient's Encryptor/Decryptor 13.

In preferred embodiments of the present invention, the Internet serves as the Wide Area Network 3. The Internet uses File Transport Protocol or "FTP", to send and receive data files. As part of this protocol, a data packet is given a FILE NAME which is used to refer to the data file as it is being read or written. The FILE NAME of the data files that get sent to the Master Key Router 4 is an 8-bit file name that matches exactly the Sender Index Key 16. This 8-bit character key uses a subset of ASCII characters that represent legal file names on a multitude of operating systems such as UNIX, and IBM-PC DOS. Because the Sender Index Key 16 is known by virtue of the FILE NAME, the Master Key Server 8 is able to look up the client's corresponding Secure Key 12 in the Database 9. The Recipient Index Key 17 and IP address (or URL) are contained in a header to the sender's message and are used by the Master Key Router 4 and Master Key Server 8 to determine where to send the message and how to encrypt the message for transmission to the Recipient Client 2.

An advantage of some preferred embodiments of the present invention is the ability to give each client what is effectively a different encryption algorithm to use locally. Thus, even if a secure key were discovered, however, unlikely, it would only have meaning if it is also associated with the particular encryption algorithm used by the client. Each client's particular algorithm is defined by a corresponding algorithm number. The algorithm number defines the initial conditions of the internal random number generator and other subtle changes to process flow in an algorithm engine. Each particular algorithm number is applied ("patched") to the algorithm engine, thereby modifying the program data used by the algorithm engine. The result is a different encryption algorithm for each client. The method of creating a multiplicity of algorithms while giving the Master Key Server 8 and Master Key Router 4 access to all algorithms is disclosed further below.

In preferred embodiments of the present invention, the Database 9 has each client's secure key and algorithm number. As with secure keys, the Master Key Server 8 is able to retrieve the algorithm number by a client's index key. Once retrieved from the Database 9, both the sender client's Secure Key 12 and corresponding algorithm number get passed to the Decryptor 5 contained in the Master Key Router 4.

The Decryptor 5 uses the sender client's Secure Key 12 and the sender's particular algorithm number obtained from the Database 9 to decrypt the information transmitted by the Sender Client 11 fully. The Decryptor 5 then delivers a copy of the decrypted information to a Temporary File 6 (memory resident). At that time, the header containing the Recipient Index Key 17 and Internet FILE NAME is stripped from the message and transferred to the DAE 7 to be used to transmit the final message ultimately to the Recipient Client 2.

The DAE 7 requests the recipient client's algorithm number and Secure Key 14, from the Database 9 in the Master Key Server 8. The Database 9 looks up those items using the Recipient Index Key 17. The DAE 7 determines the inverse algorithm of the Recipient's Encryptor/Decryptor 13 from the recipient's algorithm number and uses that inverse (which, in the preferred embodiment, is a decryption algorithm used to perform encryption) to reencrypt the information from the Sender Client 11. The Master Key Router 4 then sends the reencrypted information to the Recipient Client 2 through the Wide Area Network 3 by referencing the Recipient Index Key 17 and other information contained in the header.

The Recipient Client 2 receives the reencrypted information from the Master Key Router 4 and uses the Recipient's Encryptor/Decryptor 13 to decrypt the message. This is possible because the Master Key Router 4 earlier used the inverse algorithm of the Recipient's Encryptor/Decryptor 13 to reencrypt the sender's message. Thus, the Master Key Router 4 acts in conjunction with the Master Key Server 8 to perform a translation from the sender client's Secure Key 12 and corresponding algorithm number to the recipient's Secure Key 14 and corresponding algorithm number.

In preferred embodiments, the Master Key Server 8 also contains a Secure Key Update 15 which modifies the sender client's Secure Key 12 after a communication is sent by that client. After a communication, the Secure Key Update 15 automatically generates a modifier string of numbers to send to the Sender Client 11. That modifier string is determined from the client's Secure Key 12 and a string of random numbers. The Secure Key Update 15 obtains information regarding the sender's location from the Decryptor 5 which has just completed decrypting the sender client's message. Before the modifier string is sent it is encrypted for access by the Sender Client 11 using the DAE 7, the current Secure Key 12, and the sender client's algorithm number. The encrypted data packet is then sent to the Sender Client 11.

The data packet is received and decrypted using the sender's encryption algorithm, Sender's Encryptor/Decryptor 1. The data packet then instructs the client's Local Secure Key 12 to modify itself to a new form based on the modifier string. This same modifier string which was created in the Secure Key Update 15 is also used to update the sender client's secure key in Database 9 so that the next time a message is either sent or received by the Sender Client 11, the modified Secure Key 12 will be used. In order to prevent the secure keys from getting out of sync, handshaking messages are sent between the Sender Client 11 and the Master Key Server 8 to ensure that both sides will be able to communicate in the future.

In preferred embodiments, a client's secure key is modified only when the client sends a message. Any client, however, may also manually request modification of its secure key. That request is sent directly to the Secure Key Update 15. Also, a client's algorithm number and index key is never modified. Once established, the algorithm number and index key for a particular client is left unchanged.

In preferred embodiments, the Master Key Server 8 further includes a New Client Initializer 10 which can integrate new users into the communications system. Under preferred embodiments, the potential new client uses a "web browser" program that accesses an "HTML" form which the new client fills out. As part of this form, the new client types in a password and other information such as its operating system type and the like. The form is sent to the New Client Initializer 10 which creates a new index key based on a sequential numbering system. Also created is an algorithm number (a string of eight bytes in the preferred embodiment) for the new client. In preferred embodiments, the algorithm number for each client is generated randomly.

The New Client Initializer 10 also creates a master client program. That program contains an algorithm engine which is "patched" with the new client's algorithm number which results in an encryption algorithm for the new client. This algorithm can now perform as a Sender's Encryptor/Decryptor 1 or Recipient's Encryptor/Decryptor 13 depending on whether the new client is sending or receiving messages. The new client's algorithm number is stored in the Database 9 and indexed using the new client's index key.

An initial secure key is created for the new client by initializing a pseudo random number generator with the new client's password entered on the HTML, form, algorithm number, and index key. This initial generator routine is contained within the master client program and the New Client Initializer 10. Once generated, the initial secure key is stored in the Database 9, indexed by the new client's index key.

Conventional methods may be used to create an initial secure key for a new client. In preferred embodiments, the method allows for initializing a pseudo random number generator with the new client password, algorithm number and index key. An example of such a method is illustrated below in C++ programming language:

```
void UpdateKey(char*Key,char*SEED)
{
    Ran.Init(SEED);         // initialize random number generator
                            // with a seed comprising
                            // a string called SEED
    for(int i=0;i<arraysize;i++)
        Key[i]^=Ran.getnextbyte();
}
Random number class::
void ran::Init(char*messup)
{
    int i;
    for(i=0;messup[i];i++)state[i&7]^=messup[i];   // 8 state variables
}
byte ran::getnextbyte()
{
    state[0]^=state[1];      // modify states to
    state[1]^=state[2]+state[8];  // a new value. Any arbitrary
              .              // lossless function then
              .              // randomizes state variable
              .              // in a constant way
    return state[0];
}
```

A program in the Master Key Server 8 generates a local configuration file that contains future private information about the new client as well as the new client's password from the HTML form. This configuration file is preferably encrypted using a simple prior art encryption system. One such method includes using a random number generator seeded with the new client's index key and algorithm number. Each byte of the random number generated is XORed with the contents of the configuration file. Decryption is performed by using the same process (the inverse algorithm is the same as the original algorithm in this case).

The client program and configuration file is compressed and transmitted using a self-extracting "ZIP.EXE" program and sent to the new client over the Internet 3. The new client must remember and use its password that was entered on the HTML page in order to install and use the client program. Once the password is verified, the client program installs itself and generates an enabled local secure key for the new client. The random number generator contained in the downloaded client program used to create the enabled secure key is identical to the generator used by the New Client Initializer 10 to create the new client's initial secure key. Because the downloaded secure key generator is seeded with the same combination of the new client's password, index key, and algorithm number, the enabled secure key is identical to the new client's initial secure key created by the New Client Initializer 10 and already stored in Database 9.

In order to ensure the new client's secure key is sufficiently randomized at the outset and to protect against the possibility that the initial secure key was compromised during the new client initialization process, each new client requests modification of its secure key from the Secure Key Update 15 before it can participate in any secured communications within the system.

Those skilled in the art will appreciate that the present invention effectuates communications between a sender client and multiple recipient clients. Under the preferred embodiment, the Master Key Router 4 and Master Key Server 8 are linked to the Wide Area Network 3 through a high bandwidth connection. Clients, however, are typically linked to the system using a low bandwidth connection, such as a modem over a phone line. Under preferred embodiments of the present invention, the sender need not copy its message to each and every recipient the sender wishes to communicate with. Nor does the sender need to concern itself with the encryption/decryption needs of the individual recipients. Instead, the Master Key Router 4 in conjunction with the Master Key Server 8 may copy a single message to a multitude of recipients and handle all attendant encryption/decryption functions through its higher bandwidth connection. As a result, the sender spends less of its own time and resources using the system.

CYCLIC REDUNDANCY CHECK (CRC)

In order to validate a given message and secure it against erroneous transmissions, preferred embodiments of the present invention employ a system called Cyclic Redundancy Check ("CRC"). Under this system, the Sender Client 11, before transmitting its message to the Master Key Router 4, first passes all of its message data through a CRC algorithm which generates a CRC number based on that message data. When the Sender Client 11 transmits its message to the Master Key Router 4, the CRC number accompanies the message as a small block of data appended to the end of the transmission. After the Master Key Router 4 decrypts the message from the sender, it runs the message data through the same CRC algorithm. The Master Key Router 4 then compares the resulting CRC number with the CRC number transmitted from the sender. If they match, the Master Key Router 4 is assured the sender's message has not been altered.

There are a multitude of methods for creating a CRC system. The best method to create such a system uses a random number generator fed by the actual message data stream. As an added measure of security, the CRC number may be calculated before the document is encrypted by the Sender Client 11. Below is a C++ class object that discloses an example of how to create a random number-based CRC:

```
class CRC
{
  public:
    CRC();
    void INIT();        // reset CRC
    void PUT(char);            // advance CRC using next character
    void GET(char *);          // copy to a string of 8 chars
  private:                     // numbers are not NULL terminated
    unsigned char K[8];// state variables used to create random number
    unsigned char C[8];
};
```

-continued

```
//-------------------------------------------------------------------\\
CRC::CRC()                    // initialize starting state
{
  INIT();
}
void CRC::INIT()              // initialize random number seed
{
  for (int i=0;i<8;i++)
    {
       K[i]=i*7+19;
       C[i]=i+23;
    }
}
void CRC::GET(char *P)        // transfer 8 byte final result
{
  for(int i=0;i<8;i++) P[i]=C[i];
}
void CRC::PUT(char P)         // randomize and insert input character "P"
{                             // each state equation is modified by an
                              // arbitrary XOR, ADD, or SUB function.
                              // one or more equations must include "P"
  C[0] ^=(P + (~P << 3)) ^ K[7];
  C[1] ^=C[0] ^ K[0];
  C[2] ^=C[1] + K[1];
  C[3] -= C[2] ^ K[2];
  C[4] ^= C[3] + K[3] + P;
  C[5] += C[4] ^ K[4];
  C[6] ^= C[5] - K[5];
  C[7] += C[6] ^ K[6];
  K[0] -= (P << 1) + K[7];
  K[1] ^= P >> 2;
  K[2] += ~P;
  K[3] += P;
  K[4] += C[0] ^ C[1];
  K[5] ^= C[4] ^ P;
  K[6] += C[0] << 1;
  K[7] ^= C[0] >> 1;
}
```

HEADER & FOOTER

Under preferred embodiments of the present invention a header is used in order to communicate certain information to the Master Key Server 8 including sender and recipient index keys. The footer simply adds the CRC to the end of the package. Under th e preferred embodiment, the header, message(s) to be sent, and footer may be defined as follows:

MAIN HEADER
Note: each Item has a leading and trailing dollar sign.
Each line is terminated with a control-E character

| ITEM | FORMAT EXAMPLE |
|---|---|
| Number of Source Documents | $nnn$ where nnn is a hexadecimal number |
| Number of Destinations | $mmm$ where mmm is a hexadecimal number |
| URL of Destination #1 | joe_blow@foo.com |
| Pointer to Source Document | $3$ use third input document |
| INDEX KEY of Destination #1 | A78KCC31 |
| URL of Destination #2 | jain_blow@foo.com |
| Pointer to Source Document | $1$ use first input document |
| INDEX KEY of Destination #2 | A78OCY3A |
| . . . | . . . |
| . . . | . . . |
| . . . | . . . |
| URL of Destination #n | http://www.foo.com |
| Pointer to Source Document | $nnn$ nth input document to use starting from 0 |
| INDEX KEY of Destination #n | 6HLI57BT |
| Size of Document #1 in hexadecimal bytes | $5A83$ |
| Size of Document #2 | $351$ |

MAIN HEADER
Note: each Item has a leading and trailing dollar sign.
Each line is terminated with a control-E character

| ITEM | FORMAT EXAMPLE |
|---|---|
| . . . | . . . |
| Size of Document #n | $AFE$ |
| Concatenated Source Documents | |
| Note: each document is stand alone and does not require separation markings as was used in the main header. The main header already defined the size of each source document. | |
| Document #1 | |
| Document #2 | |
| . . . | |
| Document #n | |
| Footer | |
| Note: no termination is necessary | |
| CRC | 8 Bytes |

ENCRYPTION and DECRYPTION

There are many methods available for encrypting and decrypting data. Generally, the best methods to use in the present invention are those in which the methods for encryption by the sender differ from the methods of decryption by the recipient. This makes the job of reverse engineering much more difficult because of the fact that the decryption algorithm is not "shipped" to the recipient with the sender's transmission. Under preferred embodiments of the present invention, only the Master Key Router 4 has the ability to decrypt the sender's original encrypted message.

Reverse engineering entails taking executable code and creating source code from it. Executable code contains no comments or labels and does not look like the language in which the original source was created. The executable code appears as an incomprehensible series of machine code instructions. The code used in the preferred embodiment has many branches which further complicates matters. It would take a great deal of time just to create C++ code from the machine code.

Even after deriving source code from the executable code, the inverse algorithm must still be derived because it is not available and not part of the executable code. Even a programmer experienced in cryptography will have trouble deriving the inverse algorithm because the algorithm code used in preferred embodiments of the present invention is extremely different from the typical programs of its class.

In any event, the enormous size of the secure key in preferred embodiments of the present invention will serve as an extreme deterrent to those who wish to access communications within the communications system.

Preferred embodiments of the present invention include a system for creating a family of encryption algorithms such that each client uses a different encryption algorithm. Each client's encryption algorithm is defined by a particular algorithm number. The algorithm number consists of a block of data with a size of 1 or more bytes. The client's encryption algorithm is generated by patching the algorithm number to an algorithm engine contained within the client program. The patch affects the initial conditions of the algorithm engine's random number generator, the pointers to state variables, and other controls. Because each client has a different algorithm number, each client ends up with a different encryption algorithm.

During the new client initiation process, a random algorithm number is assigned to the new client. A master copy of the client program containing an algorithm engine is modified by poking in the number of bytes corresponding to the new client's algorithm number in a fixed location of memory within the algorithm engine. The resulting encryption algorithm along with the rest of the client program is ultimately downloaded to the new client to enable that client to engage in secure communications in this system.

Because encryption and decryption using the encryption algorithms in preferred embodiments are fully reversible processes and because clients' encryption algorithms are defined solely by their algorithm numbers, the Master Key Router 4 needs only to obtain a particular client's algorithm number from the Master Key Server 8 to decrypt messages from or encrypt messages to that client.

Those skilled in the art will appreciate that there are a plethora of methods that may be used to modify the encryption and decryption pair. In preferred embodiments of the present invention, the methods must ensure that the pair are exact reversals of each other. Most encryption systems use a random number generator initialized by a seed derived from the secure key and then perform an XOR function with the data stream to be encrypted.

Several aspects of preferred embodiments of the present invention frustrate the use of traditional encryption analysis programs to access communications within the system. The client algorithm must first be reverse engineered in order to break into the system.

Moreover, sparse use of the secure key in preferred embodiments provides a significant security benefit by allowing the system to use an extremely large key without slowing down the performance of the encryption system. Because larger secure keys allow for a greater number of possible combinations for the key, the larger the secure key used, the more difficult it is to decipher. Therefore, use of an extremely large secure key helps prevent unauthorized access to communications within the system.

Preferred embodiments of the present invention use a key size of 256 bytes which is equivalent to 2048 bits. Prior art systems typically use secure keys which range from 64 bits to 256 bits in length. The prior art generally does not disclose systems using secure keys larger than 256 bits. The enormous size of the secure key used in the preferred embodiments of the present invention will likely frustrate any brute force attempt to crack the code.

Also used in preferred embodiments of the present invention is a sparsely used array of state variables. The state variables form a huge random sequence generator which is used further to encrypt the data. Each pass of the encryption system, producing one character of encrypted data, modifies one out of the 256 state variables which is a function of one out of 256 secure key characters. Several of the states in this pool of state variables which get pointed to by one or more of the algorithm data elements, are used to form a localized random number stream that further encrypts the data stream.

Embodiments of the present invention may also utilize a "method pointer", initialized by a client's specific algorithm number, to cause each data element in the stream of data to be encrypted using a different method of scrambling the data. Preferred embodiments use twelve different methods to scramble data (although more could be used). The sequence of methods used is determined by the client's algorithm number. Because the method pointer is initialized using a specific algorithm number, starting with different initial parameters will result in an entirely different combination of encryption methods. In order to decipher the message, potential analysis systems must determine the EXACT combination of methods used to encrypt the message.

Added to the arsenal of encryption methods used in preferred embodiments of the present invention are reversible maps. A reversible map has the following property: x=MAP[MAP[x]]. Also used are several reversible functions. These have the following property:

```
z = F(x, y);              // scramble
x = F(z, y); or  x = G(z, y);   // unscramble Use G if F is not its own
inverse function.
```

Where: y is a modifier, x=input data, z=encrypted data, and F(x, y) a reversible function.

G(x, y) is an alternate function for the reversal process making F & G related.

The combination of all these techniques yields an encryption/decryption system virtually impossible to crack. As long as the secure key remains secret, preferred embodiments of the invention approaches absolute security. Modifying the secure key after each use in some preferred embodiments may further secure the system by creating a moving target.

On the following pages is an example of a C++ program function that implements the above-discussed methods:

As discussed above, in preferred embodiments of the present invention, algorithm numbers are randomly generated for each client and stored in the Database 9 indexed by the client's corresponding index key. In an alternative embodiment, algorithm numbers for each client are generated by means of a pseudo-random number generator using the client's specific index key as a seed. When the Master Key Server 8 requires a client's algorithm number, it derives the algorithm number from that client's index key using the same pseudo-random number generator. Thus, in this alternative embodiment, client algorithm numbers do not need to be stored in the Database 9.

Similarly, while the preferred embodiments of the present invention contemplate that each client in the system may send and receive messages at any time, it will be apparent to those skilled on the art based on the present disclosure that other embodiments of the invention can include one or more clients who lack the capability to send messages to receive messages, or to send or receive messages.

MERCHANDISING

In a merchandising system according to the present invention, transactions are conducted over a large public network, such as the Internet. Each transaction involves a merchant, a customer and a financial institution (or money processor) that use computer systems connected to the network.

Each merchant, customer and financial institution that may participate in transactions has its own secure key. A copy of each key also exists in a central, secure database system that is also connected to the network. Each customer also uses a free "internet consumer kit" containing the software for conducting transactions. Internet consumer kits preferably are widely available. For example, the kits may be made available at each participating merchant. Each merchant uses an integrated communications software package that includes a database, a customer interface, a bank interface, and a virtual HTML store generator. A wide variety of software for implementing the above features, and those features described herein, will be apparent to those skilled in the art based on the present disclosure.

The customer selects products to purchase by accessing a merchant's Web site and clicking on one or more "links" that put the products in a "virtual shopping cart." The customer then clicks a "checkout link" that causes an itemized priced list to be downloaded to the customer's computer. Once downloaded, this information is merged with information locally stored on the customer's computer. The local customer's computer system then adds sales tax information and sends this information along with a shipping address back to the merchant. Credit card information from the client is sent directly to the bank; the merchant never receives the customer's credit card information. The bank informs the merchant that the transaction is complete.

Figure 2:
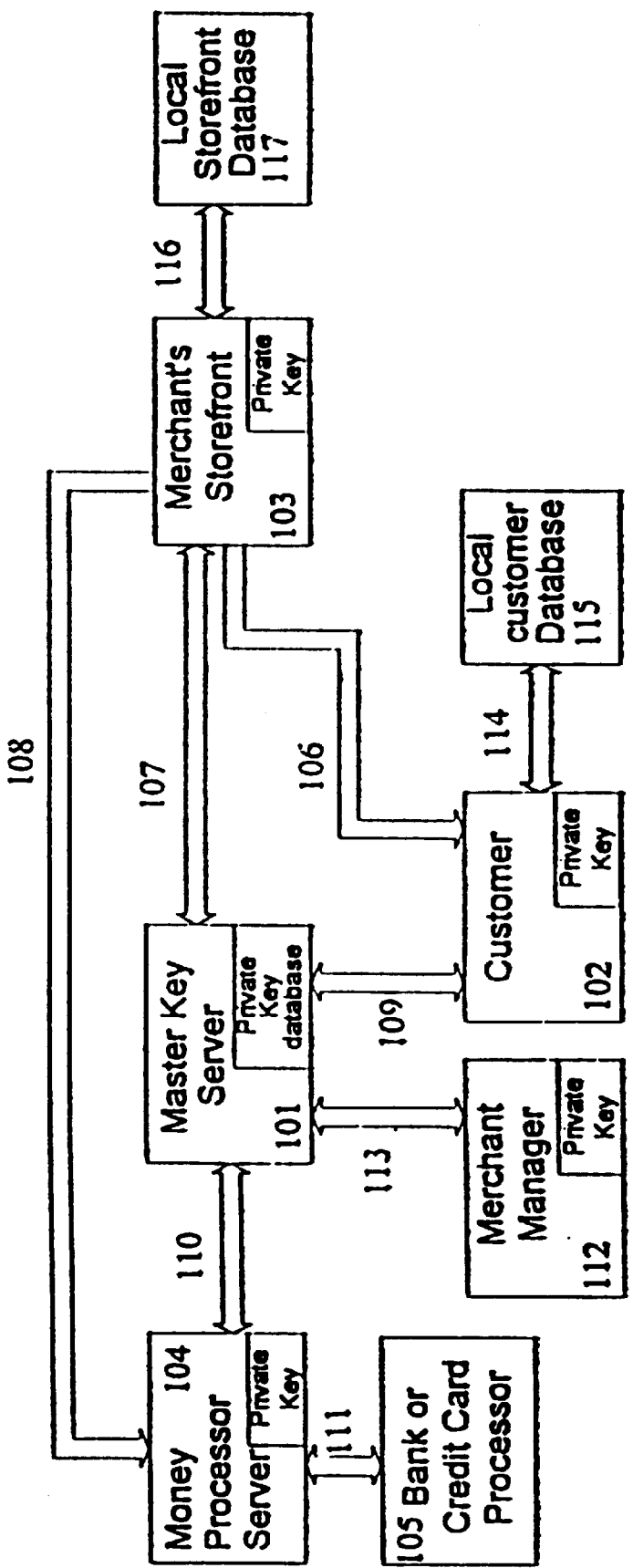
FIG. 2 is a block diagram of a merchandising system embodiment of the present invention.

The structure of a merchandising system according to the present embodiment is described in more detail below in connection with FIG. 2. For the sake of clarity, FIG. 2 shows only a single merchant computer system and a single customer system. It is understood that the present embodiment permits any number of merchant and customer systems, each of which operates as described below. The merchant, customer and money processor computer systems shown in FIG. 2 independently run interrelated software programs and function as a group to permit merchandising according to the present embodiment.

A master key server system 101 acts as a secure communications router. Master key server 101 communicates with various computer systems over the Internet or other public network system. The communication paths between master key server and various other computer systems are shown as path-107, path-109, and path-110.

Customer computer system 102 initiates communications. Customer system 102 obtains information from the merchant computer system 103 over communication path-106. Information generally is sent in the form of HTML pages that are dynamically created by the merchant system. Each time a customer clicks on an item in a store, the information is stored in a logical "shopping cart." When the customer finally clicks on "go to cashier," a file containing all selected items gets transmitted to the customer in a single file. This file is lightly encrypted and sent to the customer for further processing. Along with this file is a password that is used by the customer to encrypt merchant and money processor data packets that are sent to the merchant and the money processor systems, respectively. After these data packets are created, they are combined in a single file, encrypted, and sent to master key server 101. The Master Key Server 101 then decrypts this file, splits it back into two separate files, the merchant data packet and the money processor data packet, and ships each packet to its final destination. Before files are shipped out, they are again encrypted. Master key server 101 has a copy of each customer's secured key and therefore, possesses the capability to decrypt the data. Because there are two levels of encryption. the Master Key Server 101 is blind to the actual data packets being sent out.

Merchant system 103 has several forms of communications. First, it has a local database 117, which stores each customer's order, all inventory items, and pricing information. This database is tightly integrated into the virtual store's software system. The merchant has a direct communications path 108 to the Money Processor Server System 109 and a direct path 106 to the Customer. Communication on these paths is performed outside of the knowledge of Master Key Server 101 so that private passwords may be used to create a two-level encryption system.

Merchant Manager 112, communicates to the storefront, via the Master Key Server 101 over the Internet via path-113. Merchant Manager 112 typically runs on a personal computer and is password protected. This allows the Store Manager to add inventory items and change pricing information. Each system that communicates to Master Key Server 101 must have a secured key which matches a secured key contained in the Master Key Server's database.

Money Processor 104, communicates directly with a financial institution (e.g. a bank) 105, via path-111. Current methods for conducting such communication include modems running on a private line direct to the bank. In other embodiments, the bank is also the money processor server 104, thereby eliminating communications path-111. Money processor system 104 receives a one-way communications packet via path-108 from the merchant store system giving it a password that will be later used to unlock a data packet originating from the customer. Communications from the money processor system back to the Merchant is routed through the Master Key Server 101 via path-110.

Each logical client of the master key server system (i.e., each customer, merchant, and money processor computer system) that owns a secured key has that key updated following each transmission or reception of data by that client. This creates a moving target; in the unlikely event that a secured key is discovered, it is valid only for a single transaction and from a single customer. There is no way that this knowledge may be applied to other transactions; thus, security is greatly improved. The most viable attack on the security of this system would be to break into the building where the master key server is located and load all the secured keys. This is where the double blind method is useful; information passing through the Master Key Server is not usable because it is sent in encrypted form which cannot be decrypted by the Master Key Server.

The merchandising system uses a series of interconnected communications to perform a transaction. The set of basic communications used by this merchandising system is described below.

1. Merchant to Customer

A customer finds a merchant Web site, clicks on the items that he desires to purchase, and presses the "BUY IT" link on his web browser software. Clicking on "BUY IT" causes a packet of information to be downloaded (FIG. 2—path 106). The name of the file being downloaded has a 3-letter suffix, such as ".ASD", which causes what is commonly known as a "Helper Application" to run and receive this file being downloaded from the Merchant via the Internet. The downloaded file is lightly scrambled and contains a custom CRC checking system that validates the contents of this file. Light scrambling is defined as the process where all the information necessary to unscramble the message including the key is sent together in one file. The decryption algorithm is contained within the customer's receiving program is identical to all customer programs. The information being sent is not sensitive information; it only details what the customer has purchased. The purpose of the light encryption is to reduce the possibility of a bogus file accidentally causing the customer program to respond. Even if someone were to figure out how to create a fake merchant, the file would eventually get thrown out because the master key server will not communicate with a merchant that is not in the master key database.

The downloaded and lightly encrypted file created by the merchant contains the following information:

(1) The merchant's account number and purchase order number. This number will eventually get passed along to the money processor system 104 by the customer, and allows the money processor system to know which merchant account to credit.

(2) The merchant's order number. This number keeps track of which order is which. This number will eventually get sent back to the merchant for tracking purposes. This number is also used by the processor system 104.

(3) An encryption key. This key is used to keep the master key server 101 honest. Data packets are encrypted two times using two different algorithms. The master key server 101 removes one level so that it can re-encrypt the packet and send it to another location. It does not know how to decrypt the second level however. It merely sends the data packet "as is" on to the next location. This double-blind method keeps all information that flows through the master key server unrecognizable as an added level of security. The Merchant sends the encryption key not only to the client, but also the money processor 104. This enables the Merchant to perform the second level of decryption of the data packet originating from the client.

(4) The list of Items that the customer selected. This information will eventually turn into a receipt that the customer may print out or save to his hard disk.

(5) A series of equations defining post-processing activities. The merchant is blind to information such as state and local taxes. In order to avoid any need for the customer to enter tax-related information into a form, post processing via a local calculator is performed on the customer's computer. As information eventually flows back to the merchant, the merchant may then account for the sales tax collected by receiving the state and county information from the customer. This makes shopping much less of a hassle by minimizing the amount of information that a customer has to enter into the Merchant's Store "HTML Page".

(6) A list of information items that the merchant requires to ship the product to the customer. This list includes shipping address, and name. Other options may also be requested such as EMAIL address, and telephone number. The customer has the option to block information to the merchant.

2. Customer to Master Key Server

After this information is received in the customer's computer, a special application program that resides on the customer's computer is launched using as input the contents of the file sent by the merchant. This application performs the following functions:

(1) Decrypts the message being sent by the merchant;

(2) Calculates local and sales taxes if any;

(3) Prompts the user to choose a credit card or ATM card to pay for the items that he selected at the merchant's store (the credit card numbers were previously stored);

(4) Creates two data packets: one to be sent back to the merchant, and the other to be sent to the credit card processing center or bank;

(5) Encrypts these two data packets using a "medium security" encryption method with the password that was sent to the customer via the data packet sent by the merchant;

(6) Combines these two data packets and creates a header detailing where they are to be sent;

(7) Encrypts the entire information packet with a "massive encryption system" that only the master key server can decrypt; and, (8) sends this file to the master key server.

3. Master Key Server to Merchant and Money Processor Systems

The master key server receives this packet sent by the customer. The file sent to the master key server 101 uses the 8 character index key name which looks up the customer's secured key in the master key database. The master key server:

(1) Decrypts the packet sent by the customer using that customer's index key to lookup a secured key which is stored in the master key database. The index key is passed to the master key database by virtue of the physical name of the file which was transmitted. In other words the file name and index key name are identical.

(2) Reads the header information that tells the master key server where to send the information. This header also defines the size of each data packet, the index key which will be used to encrypt the data packet, and the Internet address of where to send this packet. Also included is the name of the file that will be downloaded. The name sent to the processor is a combination of the order number, and the merchant account number (which said merchant account number happens to be the merchant's index key). The name of the file sent back to the merchant is the order number.

(3) Separates each data packet and re-encrypts each data packet using the target secured key associated with the secured key of the recipient. The master key server uses the "decryption" algorithm to "encrypt" the data. This helps to further secure the data because the algorithm to encrypt is different from the algorithm to decrypt. Deriving the decryption algorithm from the encryption algorithm is a difficult and painfully slow process at best. This process includes reverse engineering several client programs.

In some embodiments, clients' algorithms are determined from the clients' corresponding index keys. Thus, in such embodiments, the master key server has the capability to derive a client's algorithm from that client's index key.

In other embodiments, the master key server stores each client's corresponding algorithm number in its database along with the client's secure key. In such embodiments, the master key server is able to access a client's algorithm number in the database by referring to the client's index key. Thus, in such embodiments, the client algorithm is unrelated to the client index key.

(4) Sends each data packet to the recipient. One data packet goes to the merchant, the other to the bank or credit card processor.

4. Money Processor To/From Merchant

Money processor system 104 receives a data packet, but does not know how to decrypt it. It must receive information concerning decryption directly from the merchant. This decryption entails a password string that was sent to the customer. The merchant originally created this password string and tells the customer and the processor what it is without the master key server ever having access to this information. This double blind method keeps the master key server honest.

The Merchant receives its data packet which contains an order number, tax information, the total price and the customer's shipping address. At no time is the credit card number exposed to the merchant or any other sensitive information that it has no business seeing. This keeps the credit card information very safe. The merchant will eventually receive a message from the credit card processor which validates the order. This information is used to change the "WEB PAGE" informing the customer that all transactions have completed.

After each use of the master key server, the secured key changes through a process of handshaking. The master key server passes a random string of characters to each client that sends a packet of data. (Note: receiving a data packet will not update the secret key. A merchant receiving a flood of data is a parallel process. Merchants and money processors change their keys on a scheduled basis. The merchant and processor may also have a block of keys so that it can update them on a rotating basis.) This random string of characters modify the old secured key creating a new secured key. Both the client and the master key server update their respective secured keys in the same way after handshaking has completed. Handshaking is performed as follows:

(1) Master Key Server sends a data packet containing a string of random numbers. This data packet is encrypted using the old secured key.

(2) Client creates a new secured key while saving the old one based on the random data it received after decryption.

(3) Client sends a message back to the Master Key Server using the "New Secured Key". The message reads: OK I got it! This message is preceded by a string of 256 pseudo random numbers generated by using the previous random data it received as a seed. The seed was also previously initialized by the index key and algorithm number.

Also part of the header is the "command" which tells the master key server that this is a key update handshake message and not a packet transmission.

(4) Master Key server receives this packet, checks the 256 numbers for validity, and returns a message back to the client further validating the new key. This message uses the new secured key.

(5) The Client then throws away the old key and uses the new key.

Each client is defined as either a customer, a merchant, or a bank. In the unlikely event that the secured keys get out of sync, a client may request a new key. This is driven by the client who sends a special message to the master key server. This message uses yet another encryption system based on the index key and the algorithm number. The client commands the master key server to discard the old index key, and to issue a new one. This encryption is necessary to prevent someone from throwing away a key that does not belong to him. This action will also cause the customer to loose all of the information contained within his local database including all credit card information. This process helps to remove orphaned index keys from cluttering the database. Also, if the system is not used in a year's time from the last use, the index key is deleted from the database.

The client program is password protected. If the client forgets his password, he will have to reenter all of the information contained within his database. It is not necessary to get a new index key. The password protection is put in place to prevent the situation where the family computer is stolen. This also prevents kids from using the system.

The credit card server is totally automated requiring no human intervention. In the event that something goes wrong, the customer may call the bank or credit card processing center. This information is contained within the final web page displayed by the merchant. That page will either tell the user that the transfer of money was successful or provide a reason for its rejection. Some common problems may be as follows: credit card expiration date has expired; credit line has been exceeded; credit card reported lost or stolen; given name on credit card does not match actual name.

There are also two logical merchants that parallel each other. One is the actual store, the other is the store manager. The store manager communicates with the actual store by using the master key server. The store manager has a special software package that has the ability to command the store to upload or download its current inventory database, change pricing information, or add new items to the database. The store manager may also change the look and feel of the store by uploading new graphics, and logos. This software package is written in such a way as to remove the complexity of creating HTML forms, programming SQL database engines, and other complex activities making the store manager able to do what he does best. This store manager software package is also password protected. This prevents dishonest employees from changing price information without the knowledge of the store manager. In the event that the store manager forgets his password, a system is put in place to extract this password. This is done using the following procedure:

(1) Store manager calls a mall manager, the mall manager being an entity with means to authenticate the identity of store managers.

(2) Mall manager verifies that the store manager is who he says he is by comparing his application with verbal questions.

(3) The mall manager then provides a temporary password that takes the store manager to a later screen which allows the merchant to enter in a new password. This temporary password is based on the combination of the index key for the store, the index key of the store manager, and a pseudo random number based on a seed created by the secured key; the mall manager does not see the secured key, but only the resulting random number. Built into this temporary password is a self-checking CRC. This temporary password only works one time and only on this one machine.

(4) A screen comes up asking the merchant manager to enter in a new password.

(5) The merchant manager must then retype the password 5 times for penance as well as pay the mall manager a hefty fine!

In the event that the secured keys for the merchant manager gets out of sync, the manager must download an "emergency repair kit". This kit is password protected, where the password must be received verbally over the phone by the mall manager. This repair kit also fixes the combined problem of a forgotten password and a out of sync secured key. This uses the same above process except for the fact that the locally stored secured key is used instead of the copy that resides in the master key server. This process of resynchronizing is different than that of a customer, because of security issues. Also, there is no locally stored information other than the secured key and password on the merchant manager's computer.

A merchandising system according to the present invention is particularly useful in connection with the popular Hyper-Text Markup Language ("HTML") used on the World Wide Web, a graphical communications system that runs over the Internet. In HTML, links point to other locations and files on the Internet. A link uses an addressing scheme similar to how mail is delivered by the post office. Domain Name Services have been deployed allowing the user to type in plain text instead of what are known as IP addresses. Currently an IP address contains 4 bytes each separated by the colon character. Below are several examples of IP addresses:

| | |
|---|---|
| 113:46:5:199 | 51:191:77:192 |
| 173:112:255:66 | 131:7:51:101 |

This provides roughly 4 billion addresses that may be used. Each of these addresses could potentially have what is known as a domain name. These domain names are registered and distributed on multiple computers and routers. A router is a device that sends information from one server to another. Several examples of Internet addresses interpreted by Domain Name Service are as follows:

> http://www.allsoft.disti.com/index.html
> http://www.microsoft.com
> ftp://ftp.linksys.com
> gopher://liberty.uc.wlu.edu/public/

The first series of characters up to and including the "//" defines a communications protocol. This tells the "Internet Web Browsers" how to interpret a data package that will eventually get transmitted. The next section contains the domain name. Domain names end in suffixes such as: net, com, edu, org, and pri. A domain name may also contain a one or more prefixes such as "www". Each prefix is delimited by a period. The computer that owns that domain name resolves these prefixes to a physical IP address or a directory. Following the domain name is a directory path name the most common being "/index.html" which indicates the official starting home page for that domain.

Another function of the Internet that predates web pages is EMAIL. An EMAIL address uses one or more prefixes such as someone's name, and appends "@" plus the domain name. Several examples are shown below:

gary@foo.com bill@whitehouse.gov mark.ee1@aol.com

Many "Internet Web Page Browsers" have what are known as "helper apps". A helper application is invoked when a file name containing a file extension consistent with that application. These helper application suffixes are programmable. Some examples follow:

| Extension name: | Program: |
|---|---|
| ".zip" | winzip.exe |
| ".wav" | mplayer.exe |
| ".ps" | gscript.exe |
| ".doc" | msword.exe |

This merchandising system uses the above concept of a "helper app" in order to launch the customer program that receives the information from the merchant which also sends this information back to the merchant and bank mixed with the customer's personal information.

The program that the customer runs is only capable of performing encryption intended for commerce only. The customer may only communicate with the bank and the merchant via the master key server (FIG. 2–101). The algorithm used cannot be easily modified to be used as a standalone encryption system. The system is further restricted by not allowing customers to talk to other customers. The information that gets sent by the customer is nothing more than credit card numbers, shipping address, name and purchase total. This kind of information does not pose a national risk, nor can facilitate drug trafficking to take place. This removes the barriers and restrictions concerning the export of this encryption technology.

It is relatively easy to establish a "virtual store". The store manager can remotely change prices, add inventory items, and even change the look of his store. This is done using a "store manager" program. This program is tightly integrated with the store front. Security is maintained because only the computer that has the store manager's secured key can change the store. The software is also password protected preventing dishonest employees from changing price information. Also included in this software package is an interface between the "Internet's virtual store" database, and the main database used by the merchant. For smaller shop keepers, it is also possible for the store manager to run his entire business from the virtual store's database keeping shipping logs, inventory, and all other aspects of running a business.

While the present invention has been described in connection with specific embodiments, the present invention is not limited to such embodiments and encompasses modifications and equivalent arrangements within the scope of the appended claims.

```
//------------------------------------------------------------------\\
//                      CRYPT                            \\
//                                                       \\
// A single key is used for both encode and decode. There are multiple \\
// methods used to scramble the data. The methods change as a function \\
// of which byte is being scrambled. The secure key is 2048 bits long. \\
// This system also uses a unique data-spinning system to defeat any   \\
// future attempt to analyze the data stream. Secure keys are rotated  \\
// each and every time the master key server is accessed.              \\
//------------------------------------------------------------------\\ define STD_OFF 210
include "globals.h"
#include <stdio.h>
typedef unsigned char byte;

//------------------------------------------------------------------\\
//                  Class Definition                     \\
//------------------------------------------------------------------\\ class CRYPT
{
 public:
   CRYPT(char *);          // use a string of stuff as a key
   CRYPT(FILE *);          // load secure key direct from file // constructor for master CRYPT program only:

ifdef __MasterCRYPT
   CRYPT(FILE *,char *);   // pass 8 chars to pick an algorithm
   CRYPT(char *,char *);   // use string as a key
endif CRYPT(CRYPT &other);    // copy just in case you need to back up!!!!
   void InitEncoder();
   void InitDecoder();
   byte Encode(byte);

// only the master can decode a message!

#ifdef __MasterCRYPT
   byte Decode(byte);
   void POKE_ALG(char *);  // insert algorithm constants
   void PEEK_ALG(char *);  // get         "         "
```

```
endif void UpdateKey(FILE *, char *);  // save new key, mess up with string!!
    private:
5   void Init();
    void INC();              // bumps StatePointer
    byte ROLL(byte,byte);    // barrel rotate
    byte SWAP(byte,byte);    // bit swapper
    byte SUM(byte,byte);     // add
10  byte SCRAMBLE(byte);
    byte UNSCRAMBLE(byte);
    char PrivateKey[257];
    byte STATE[256];         // changes with each new input
    byte PKEY[256];          // stays constant
15  int  StatePointer;
    int  KeyPointer;
    int  Method;
    byte Spin;
    byte DataSpinZ;          // data dependent spin cycle
20  byte DataSpinY;
    int  CopyPtr;            // use copyright notice for encryption
    char *AlgorithmPointer;
    };

25  //----------------------------------------------------------------\\
    //            CLASS Implementation                                \\
    //----------------------------------------------------------------\\

// this routine causes the secure key file to modify itself and may be used
30  // before or after a transmission of data.

void CRYPT::UpdateKey(FILE *Wr, char *K)
    {
    // assume file already opened!
35
    int i, j;
    byte c;

for(i=0,j=0;i<256;i++,j++)
40    {
      if (!K[j]) j=0;
      c = K[j]^PKEY[i]^STATE[i];
      fputc(c, Wr);
      }
45  fclose(Wr);
```

```
       }
       CRYPT::CRYPT(char *A)    // A must be less than 256!!
       {
 5       int i, j;
         // hide the Algorithm number inside the copyright notice data array!!
         AlgorithmPointer=G_CopyRight; AlgorithmPointer+=STD_OFF;
         for (i=0;A[i];i++);
         for (j=0;j<i;j++) PrivateKey[j]=A[j];
10       PrivateKey[j]=0;
         InitEncoder();
       }

CRYPT::CRYPT(FILE *F)
15     {
         int j;
         AlgorithmPointer=G_CopyRight; AlgorithmPointer+=STD_OFF;
         for (j=0;j<256;j++)
           {
20           PrivateKey[j]=fgetc(F); // add file check later....
             if (!PrivateKey[j]) PrivateKey[j]++;  // forbid 0!
           }
         fclose(F);
         PrivateKey[256]=0;
25       InitEncoder();
       } ifdef __MasterCRYPT

30     // use index key string to generate algorithm number

CRYPT::CRYPT(char *A,char *ST)
       {
         int i, j;
35       AlgorithmPointer=G_CopyRight; AlgorithmPointer+=STD_OFF;
         for(j=0;j<8;j++)
           {
             AlgorithmPointer[j] = ST[j]; // modify global data block to match client
           }
40       i=9+(AlgorithmPointer[0]&7);    // mess up to create the key
         for(j=0;j<i;j++)
           {
             AlgorithmPointer[0]^= ((byte)AlgorithmPointer[3] >> 1)
                      + (AlgorithmPointer[7] << 1 );
45           AlgorithmPointer[1]+= (byte)AlgorithmPointer[0]
```

```
                        + (byte)AlgorithmPointer[2];
         AlgorithmPointer[2]^= AlgorithmPointer[0] << 1;
         AlgorithmPointer[3]+= (byte)AlgorithmPointer[1] >> 2;
         AlgorithmPointer[4]+= G_MAP0[AlgorithmPointer[2]&0xff];
5        AlgorithmPointer[5]^= AlgorithmPointer[3] + AlgorithmPointer[4];
         AlgorithmPointer[6]+= G_MAP1[AlgorithmPointer[5]&0xff];
         AlgorithmPointer[7]^= AlgorithmPointer[6]+AlgorithmPointer[1];
       }
     for (i=0;A[i];i++);
10   for (j=0;j<i;j++) PrivateKey[j]=A[j];
     PrivateKey[j]=0;
     InitEncoder();
   }

15 CRYPT::CRYPT(FILE *F, char *ST)   // use file as a key
   {
     int i, j;
     // point to modify block 20   AlgorithmPointer=G_CopyRight; AlgorithmPointer+=STD_OFF;
     for(j=0;j<8;j++)
       {
         AlgorithmPointer[j] = ST[j];   // modify by assignment
       }
25   i=9+(AlgorithmPointer[0]&7);        // mess up to create the key
     for(j=0;j<i;j++)
       {
         AlgorithmPointer[0]^= ((byte)AlgorithmPointer[3] >> 1)
                   + (AlgorithmPointer[7] << 1 );
30       AlgorithmPointer[1]+= (byte)AlgorithmPointer[0]
                   + (byte)AlgorithmPointer[2];
         AlgorithmPointer[2]^= AlgorithmPointer[0] << 1;
         AlgorithmPointer[3]+= (byte)AlgorithmPointer[1] >> 2;
         AlgorithmPointer[4]+= G_MAP0[AlgorithmPointer[2]&0xff];
35       AlgorithmPointer[5]^= AlgorithmPointer[3] + AlgorithmPointer[4];
         AlgorithmPointer[6]+= G_MAP1[AlgorithmPointer[5]&0xff];
         AlgorithmPointer[7]^= AlgorithmPointer[6]+AlgorithmPointer[1];
       }
     for (j=0;j<256;j++)
40     {
         PrivateKey[j]=fgetc(F); // add file check later....
         if (!PrivateKey[j]) PrivateKey[j]++;   // forbid 0!
       }
     fclose(F);
45   PrivateKey[256]=0;
```

```
      InitEncoder();
    }

5  void CRYPT::POKE_ALG(char *B)       // insert algorithm constants
    {
      for (int i=0;i<8;i++) AlgorithmPointer[i] = B[i];
    }

10  void CRYPT::PEEK_ALG(char *B)       // Copy algorithm number constant
    {
      for (int i=0;i<8;i++) B[i]=AlgorithmPointer[i];
    }
    #endif
15
    void CRYPT::Init()
    {
      StatePointer=(byte)AlgorithmPointer[0];
      KeyPointer=(byte)AlgorithmPointer[1];
20    Method=AlgorithmPointer[2] & 7;
      Spin=0;
      DataSpinZ=(byte)AlgorithmPointer[3];
      DataSpinY=(byte)AlgorithmPointer[4];
      CopyPtr=STD_OFF;
25    int i;

for (i=0;i<256;i++)
        {
          PKEY[i] = i ^ 0x5A ^ G_CopyRight[i] ;
30        STATE[i]= i ^ 0xBC ^ G_CopyRight[i+1];
        }
      for (i=0;i<256;i++)
        {
          PKEY [STATE[(i^AlgorithmPointer[6]) && 0xff]] ^=
35           (STATE[ROLL(PKEY[i^0xab])],3);
          STATE[STATE[(i^AlgorithmPointer[5]) && 0xff]] ^=
            (PKEY [ROLL(PKEY[i^0xea],2)]);
        }
    }
40
    void CRYPT::InitEncoder()
    {
      int i=0,j=0,k=0,zz;
      zz=1017+(byte)AlgorithmPointer[7];
45    byte Munge=0;
```

```
        Init();
        for (i=0;i<zz;i++)
            {
            if (PrivateKey[j]==0) j=0;
            k &=0xFF;
            PKEY[k] ^= (Munge += PrivateKey[j]);
            k++; j++;
            }
        } void CRYPT::INC() // modify next use of pointers into the two arrays
        {
        StatePointer+=23;
        StatePointer&=0xff;
        KeyPointer+=31;
        KeyPointer&=0xff;
        } byte CRYPT::Encode(byte A)
        {
        byte B;
        B=A^DataSpinZ^DataSpinY;        // introduce data into random sequence generator
        DataSpinY+=DataSpinZ;
        DataSpinZ^=A;
        A=B;
        switch (Method) // use a different method of encryption for each byte of data
            {
            case 0: // Simple XOR ...
                B = A ^ STATE[StatePointer] ^ PKEY[KeyPointer];
                INC();
                STATE[KeyPointer]^=PKEY[StatePointer];
                Method++;
                break;
            case 1: // ROLL with XOR ...
                B = ROLL(A,(PKEY[KeyPointer]^7)+1) ^ STATE[PKEY[StatePointer]];
                INC();
                STATE[StatePointer]^= AlgorithmPointer[0];
                Method++;
                break;
            case 2: // BIT SWAP with XOR ...
                B = SWAP(A,STATE[StatePointer]) ^ PKEY[STATE[KeyPointer]];
                INC();
                STATE[StatePointer]^= ROLL(PKEY[KeyPointer],3);
                Method++;
```

```
                break;
            case 3: // ADD with XOR ...
                B = SUM(A,STATE[StatePointer]) ^ PKEY[KeyPointer];
                INC();
                STATE[KeyPointer]^= ROLL(STATE[StatePointer],PKEY[KeyPointer]);
                Method++;
                break;
            case 4: // SCRAMBLE
                B = SCRAMBLE(A);
                INC();
                STATE[KeyPointer^StatePointer]^=
                    SWAP(PKEY[KeyPointer],PKEY[StatePointer^0x5a]);
                Method++;
                break;
            case 5: // LUT #0
                B = G_MAP1[G_MAP0[A] ^ STATE[StatePointer] ^ PKEY[KeyPointer]];
                INC();
                STATE[KeyPointer]^=PKEY[G_MAP0[StatePointer]];
                Method++;
                break;
            case 6: // LUT #1
                B = G_MAP0[G_MAP1[A] ^ STATE[StatePointer] ^ PKEY[KeyPointer]];
                INC();
                STATE[KeyPointer]^=PKEY[G_MAP1[KeyPointer]];
                Method=0;
                break;
        }
        B^=Spin;
        Spin ^= PKEY[KeyPointer]^STATE[Spin+1];
        STATE[(byte)AlgorithmPointer[1]]^= SWAP(Spin,STATE[Spin]);
        STATE[(byte)AlgorithmPointer[2]]^=
            SWAP(Spin^STATE[(byte)AlgorithmPointer[1]], STATE[StatePointer]);

B^=G_CopyRight[CopyPtr++];  // use copyright notice to mess up stuff!!
        CopyPtr&=0xff;

return B;
    } byte CRYPT::SUM(byte A, byte N)   // reversible function
    {
        return (byte)((N+A)&0xff);
    }
```

// only the master key system may do this:

ifdef __MasterCRYPT

```
5       byte CRYPT::Decode(byte A)
        {
          byte B;
          A^=Spin;
          A^=G_CopyRight[CopyPtr++];
10        CopyPtr&=0xff;
          switch (Method)
            {
            case 0: // Simple XOR ... sort of
                B = A ^ STATE[StatePointer] ^ PKEY[KeyPointer];
15              INC();
                STATE[KeyPointer]^=PKEY[StatePointer];
                Method++;
                break;
            case 1: // ROLL with XOR ...
20              B = ROLL(A^STATE[PKEY[StatePointer]],PKEY[KeyPointer]);
                INC();
                STATE[StatePointer]^= AlgorithmPointer[0];
                Method++;
                break;
25          case 2: // BIT SWAP with XOR ...
                B = SWAP(A,STATE[StatePointer] ^ PKEY[STATE[KeyPointer]]);
                INC();
                STATE[StatePointer]^= ROLL(PKEY[KeyPointer],3);
                Method++;
30              break;
            case 3: // SUB with XOR ...
                B = SUM(A ^ PKEY[KeyPointer],-STATE[StatePointer]) ;
                INC();
                STATE[KeyPointer]^= ROLL(STATE[StatePointer],PKEY[KeyPointer]);
35              Method++;
                break;
            case 4: // Unscramble
                B = UNSCRAMBLE(A);
                INC();
40              STATE[KeyPointer^StatePointer]^=
                    SWAP(PKEY[KeyPointer],PKEY[StatePointer^0x5a]);
                Method++;
                break;
            case 5: // LUT #0
45              B = G_MAP0[G_MAP1[A] ^ STATE[StatePointer] ^ PKEY[KeyPointer]];
```

33

```
            INC();
            STATE[KeyPointer]^=PKEY[G_MAP0[StatePointer]];
            Method++;
            break;
        case 6: // LUT #1
            B = G_MAP1[G_MAP0[A] ^ STATE[StatePointer] ^ PKEY[KeyPointer]];
            INC();
            STATE[KeyPointer]^=PKEY[G_MAP1[KeyPointer]];
            Method=0;
            break;
        }

// each use of the AlgorithmPointer causes the algorithm to behave differently
        Spin ^= PKEY[KeyPointer]^STATE[Spin+1];
        STATE[(byte)AlgorithmPointer[1]]^= SWAP(Spin,STATE[Spin]);
        STATE[(byte)AlgorithmPointer[2]]^=
            SWAP(Spin^STATE[(byte)AlgorithmPointer[1]],STATE[StatePointer]);

A=B^DataSpinZ^DataSpinY;  // undo data entered into random data stream.
        DataSpinY+=DataSpinZ;
        DataSpinZ^=A;   // reverse data dependent encryption!
        return A;
    }
    #endif void CRYPT::InitDecoder() { InitEncoder(); }

CRYPT::CRYPT(CRYPT &other)
    {
        int i;
        for (i=0;i<256;i++)
        {
            STATE[i]=other.STATE[i];
            PKEY[i]=other.STATE[i];
            PrivateKey[i]=other.PrivateKey[i];
        }
        StatePointer=other.StatePointer;
        KeyPointer = other.KeyPointer;
        Method = other.Method;
        Spin = other.Spin;
        DataSpinZ = other.DataSpinZ;
        DataSpinY = other.DataSpinY;
        CopyPtr = other.CopyPtr;
```

```
      AlgorithmPointer = other.AlgorithmPointer;
    }

// This routine rotates the bits in 'A' left by 'N' unless 0
5   byte CRYPT::ROLL(byte A, byte N)   // reversible function
    {
      byte R;
      N &=7;
      if (N==0) // no rotation? just XOR the data with a constant.
10      {
          R = A ^ AlgorithmPointer[4];
        }
      else
        {
15        int i=A;
          i<<=N;
          i=(i&0xff)|(i >> 8);
          R=i;
        }
20    return R;
    } byte CRYPT::SCRAMBLE(byte A)   // does a mix of stuff
    { byte R;
25    R=SWAP(STATE[StatePointer],A);
      R=SUM(STATE[KeyPointer],R);
      R^= PKEY[StatePointer];
      return R;
    }
30
    byte CRYPT::UNSCRAMBLE(byte A)   // undoes a mix of stuff
    { byte R;
      R=A ^ PKEY[StatePointer];
      R=SUM(-STATE[KeyPointer],R);
35    R=SWAP(STATE[StatePointer],R);
      return R;
    }

40
    byte CRYPT::SWAP(byte A, byte N)   // reversible function
    {
    //        AABBCCDD    swapped niblets
45    byte R,T1,T2;
```

35

```
        N &= 0x70;
        switch (N)
        {
          case 0x00: // A <-> B
 5          T1 = (A & 0xC0)>>2;
            T2 = (A & 0x30)<<2;
            R  = (A & 0x0f) | T1 | T2 ;
            break;
          case 0x10: // B <-> C
10          T1 = (A & 0x30)>>2;
            T2 = (A & 0x0C)<<2;
            R  = (A & 0xC3) | T1 | T2 ;
            break;
          case 0x20: // C <-> D
15          T1 = (A & 0x0C)>>2;
            T2 = (A & 0x03)<<2;
            R  = (A & 0xF0) | T1 | T2 ;
            break;
          case 0x30: // A <-> C
20          T1 = (A & 0xC0)>>4;
            T2 = (A & 0x0C)<<4;
            R  = (A & 0x33) | T1 | T2 ;
            break;
          case 0x40: // B <-> D
25          T1 = (A & 0x30)>>4;
            T2 = (A & 0x03)<<4;
            R  = (A & 0xCC) | T1 | T2 ;
            break;
          case 0x50: // A <-> D
30          T1 = (A & 0xC0)>>6;
            T2 = (A & 0x03)<<6;
            R  = (A & 0x3C) | T1 | T2 ;
            break;
          case 0x60: // A <-> D , B <-> C
35          T1 = (A & 0xC0)>>6;
            T2 = (A & 0x03)<<6;
            R  = (A & 0x3C) | T1 | T2 ;
            T1 = (R & 0x30)>>2;
            T2 = (R & 0x0C)<<2;
40          R  = (R & 0xC3) | T1 | T2 ;
            break;
          case 0x70: // A <-> C , B <-> D
            T1 = (A & 0xC0)>>4;
            T2 = (A & 0x0C)<<4;
45          R  = (A & 0x33) | T1 | T2 ;
```

```
                T1 = (R & 0x30)>>4;
                T2 = (R & 0x03)<<4;
                R  = (R & 0xCC) | T1 | T2 ;
                break;
        };
    return R;
    }
```

Header file "globals.h" used by crypt.h:

// Global constants to be used by crypt.h

```
char *G_CopyRight =
    "CopyRight 1996 Allsoft Distributing Incorporated\n "
    "All rights reserved. You may not distribute\n    "
    "disassemble, translate, or use this program\n    "
    "outside of the contexts of its orriginal purpose.\n "
    " af$68()@+91BxZzqQ3PlLdD2@|`~[]}{><,.?/:;'_',.pol- "  // signature block
    " Bryan Colvin,,Dale Colvin,,Bill and Brian,,others ";
```

// Note: modify program executable using an offset of this string
//       of 210. You may use whatever you fill like!

// two reversible maps... i.e. k = MAP[MAP[k]]
const unsigned char G_MAP0[256]=
{
   0x2A, 0xFF, 0x1A, 0x15, 0xA0, 0xCE, 0x89, 0x37, 0x65, 0xD1, 0xFE, 0xB9, 0xE7, 0xB7,
   0x5F, 0x76, 0x9B, 0xB1, 0xC8, 0xE4, 0x85, 0x03, 0x57, 0x6E, 0xB4, 0xE2, 0x02, 0x86,
   0x6B, 0x99, 0x28, 0xB2, 0xE0, 0xF7, 0xD8, 0xC1, 0x90, 0x79, 0x62, 0x4B, 0x1E, 0x45,
   0x00, 0x7A, 0x7C, 0x7E, 0xAC, 0xAF, 0xC6, 0xC7, 0xDE, 0xDC, 0xDB, 0xD9, 0xD6, 0x07,
   0xE8, 0xF1, 0x46, 0xE9, 0x8B, 0xF0, 0x8C, 0x4E, 0x8A, 0xA2, 0xBA, 0xD3, 0xFC, 0x29,
   0x3A, 0x48, 0x47, 0xA3, 0xA5, 0x27, 0xA6, 0xA4, 0x3F, 0x52, 0xF2, 0xA7, 0x4F, 0xEA,
   0xEF, 0xBC, 0x8E, 0x16, 0x8D, 0x96, 0x73, 0x72, 0xBE, 0x74, 0xC0, 0x0E, 0xF8, 0xCF, 0x26, 0xD0, 0xF9, 0x08, 0xBD, 0xF3, 0xFA, 0xEB, 0xF4, 0x1C, 0xBF, 0x8F, 0x17, 0x80,
0x9D, 0x75, 0x5B, 0x5A, 0x5D, 0x71, 0x0F, 0xDF, 0x7F, 0x25, 0x2B, 0xDD, 0x2C, 0xDA,
0x2D, 0x78, 0x6F, 0xEC, 0xD2, 0xF5, 0xD5, 0x14, 0x1B, 0x95, 0xA1, 0x06, 0x40, 0x3C,
0x3E, 0x58, 0x56, 0x6D, 0x24, 0xFD, 0xFB, 0xE3, 0xB5, 0x87, 0x59, 0xAA, 0xED, 0x1D,
0xEE, 0x10, 0xAB, 0x70, 0xC2, 0xE6, 0x04, 0x88, 0x41, 0x49, 0x4D, 0x4A, 0x4C, 0x51,
0xB3, 0xC3, 0x97, 0x9C, 0x2E, 0xC4, 0xE5, 0x2F, 0xC5, 0x11, 0x1F, 0xA8, 0x18, 0x94,
0xF6, 0x0D, 0xC9, 0x0B, 0x42, 0xCA, 0x55, 0x66, 0x5C, 0x6C, 0x5E, 0x23, 0x9E, 0xA9,
0xAD, 0xB0, 0x30, 0x31, 0x12, 0xB8, 0xBB, 0xD4, 0xD7, 0xE1, 0x05, 0x61, 0x63, 0x09,
0x82, 0x43, 0xCB, 0x84, 0x36, 0xCC, 0x22, 0x35, 0x7D, 0x34, 0x33, 0x7B, 0x32, 0x77,
0x20, 0xCD, 0x19, 0x93, 0x13, 0xAE, 0x9F, 0x0C, 0x38, 0x3B, 0x53, 0x69, 0x81, 0x98,
0x9A, 0x54, 0x3D, 0x39, 0x50, 0x67, 0x6A, 0x83, 0xB6, 0x21, 0x60, 0x64, 0x68, 0x92,
0x44, 0x91, 0x0A, 0x01
};

const unsigned char G_MAP1[256]=
{
0xFE, 0xFC, 0xF9, 0xF8, 0xF6, 0xF3, 0xF1, 0xEE, 0xED, 0xEA, 0xE9, 0xE6, 0xE5, 0xE2,
0xE1, 0xDE, 0xDD, 0xE0, 0xE3, 0xE7, 0xEB, 0xEF, 0xF2, 0xF5, 0xF4, 0xF0, 0xBF, 0xC2,
0xD9, 0xD8, 0xD6, 0xD5, 0xD3, 0xD2, 0xD0, 0xCF, 0xCD, 0xCC, 0xCA, 0xCB, 0xCE, 0xD1,
0xD4, 0xD7, 0xDB, 0xDA, 0xB8, 0xB6, 0x80, 0x82, 0x83, 0x85, 0x86, 0x88, 0x89, 0x8B,
0x8A, 0xA1, 0x9E, 0x9B, 0x98, 0x95, 0x93, 0x90, 0x8D, 0x8E, 0x91, 0x92, 0xA9, 0xA8,
0xA6, 0xA5, 0xA3, 0xA2, 0xA4, 0xA7, 0xAC, 0xAB, 0xB0, 0xAF, 0xB4, 0xB3, 0xB7, 0xB5,
0xB1, 0xAE, 0xC5, 0xC1, 0xC0, 0xDC, 0xDF, 0xE4, 0xEC, 0xE8, 0xFF, 0xFD, 0xFB, 0xFA,
0xF7, 0xC9, 0xC7, 0xC4, 0xC3, 0xC6, 0xC8, 0xB2, 0xBB, 0xB9, 0xBA, 0xBD, 0xBC, 0xBE, 0xAA, 0x9F, 0x9D, 0x9A, 0x97, 0x96, 0x94, 0x99, 0x9C, 0xA0, 0x7C, 0x81, 0x7A, 0x84,
0x87, 0x8C, 0x30, 0x7B, 0x31, 0x32, 0x7D, 0x33, 0x34, 0x7E, 0x35, 0x36, 0x38, 0x37,
0x7F, 0x40, 0x41, 0xAD, 0x3F, 0x42, 0x43, 0x3E, 0x76, 0x3D, 0x75, 0x74, 0x3C, 0x77,
0x73, 0x3B, 0x78, 0x72, 0x3A, 0x71, 0x79, 0x39, 0x49, 0x48, 0x4A, 0x47, 0x46, 0x4B,
0x45, 0x44, 0x70, 0x4D, 0x4C, 0x8F, 0x55, 0x4F, 0x4E, 0x54, 0x69, 0x51, 0x50, 0x53,
0x2F, 0x52, 0x2E, 0x6B, 0x6C, 0x6A, 0x6E, 0x6D, 0x6F, 0x1A, 0x58, 0x57, 0x1B, 0x66,
0x65, 0x56, 0x67, 0x64, 0x68, 0x63, 0x26, 0x27, 0x25, 0x24, 0x28, 0x23, 0x22, 0x29,
0x21, 0x20, 0x2A, 0x1F, 0x1E, 0x2B, 0x1D, 0x1C, 0x2D, 0x2C, 0x59, 0x10, 0x0F, 0x5A,
0x11, 0x0E, 0x0D, 0x12, 0x5B, 0x0C, 0x0B, 0x13, 0x5D, 0x0A, 0x09, 0x14, 0x5C, 0x08,
0x07, 0x15, 0x19, 0x06, 0x16, 0x05, 0x18, 0x17, 0x04, 0x62, 0x03, 0x02, 0x61, 0x60,
0x01, 0x5F, 0x00, 0x5E
};

I claim:

1. A communications system, comprising:

a transmitting client and a receiving client, each client having an associated secure key and an encryptor/decryptor for encrypting and decrypting messages using the secure key; and a master key router remotely disposed from the transmitting client and the receiving client having a decryptor for decrypting messages encrypted with the secure key of the transmitting client, and having au encryptor for encrypting messages with the secure key of the receiving client;

wherein messages between the transmitting client and the receiving client pass through the master key router, and wherein the master key router is configured to decrypt the message using the secure key of the sending client and a unique algorithm associated with the sending client and encrypt the message using the secure key of the receiving client and a unique algorithm associated with the receiving client.

2. The communications system of claim 1, wherein each client has an associated index key.

3. The communications system of claim 2, further comprising:

a master key server, the master key server having a database storing duplicates of the secure keys associated with each of the clients indexed according to the clients' respective index keys;

wherein the master key router communicates the index keys associated with the sending client and the receiving client to the master key server, the master key server uses the index keys associated with the sending client and the receiving client to look up the secure keys for the sending client and the receiving client respectively and communicates those secure keys to the master key router.

4. The communications system of claim 3, wherein the master key server is configured to add new clients.

5. The communications system of claim 1, wherein the master key router is configured to use secure keys of arbitrary length.

6. The communications system of claim 4, wherein the algorithms are determined by patching blocks of data to an algorithm template.

7. The communications system of claim 6, wherein the blocks of data patched to the algorithm engine contain the initial conditions for a random number generator within the algorithm engine.

8. The communications system of claim 7, wherein the blocks of data patched to the algorithm engine further contain the initialization of pointers to cause each data element in the streams of data to be encrypted to be scrambled using a different method.

9. The communications system of claim 4, wherein the unique algorithms for each client are generated by means of a pseudo-random number generator that uses clients' index keys as seeds such that the master key server may derive clients' algorithm numbers without the requirement of storing said algorithm number in the database within the master key server.

10. The communications system of claim 4, wherein the master key router's decryptor decrypts messages encrypted with a secure key of a first client utilizing the inverse of said first client's encryption algorithm and the master key router's encryptor encrypts messages with a secure key of a second client utilizing the inverse of said second client's encryption algorithm.

11. The communications system of claim 10, wherein the encryption algorithms of said first client and said second client differ and are determined by patching blocks of data to an algorithm engine and wherein the master key router is configured to derive a any particular client's algorithm by patching the algorithm engine with the same blocks of data used to determine that client's algorithm.

12. The communications systems of claim 1, wherein each secure key used for sending a message is modified after the message is transmitted.

13. The communications system of claim 1, wherein the encryption and decryption of communications between the transmitting client and the receiving client utilizes state variables to create a random number stream and the state variable data is only partially used for each character of data to be transmitted or received.

14. The communications system of claim 1, wherein the communications between the transmitting client and the receiving client comprises a stream of characters and encryption and decryption of the stream of characters involves modifying each character in the stream of characters by a different method of encryption or decryption.

* * * * *